N. E. IRISH.
Neck-Yoke Coupling.
No. 167,768. Patented Sept. 14, 1875.
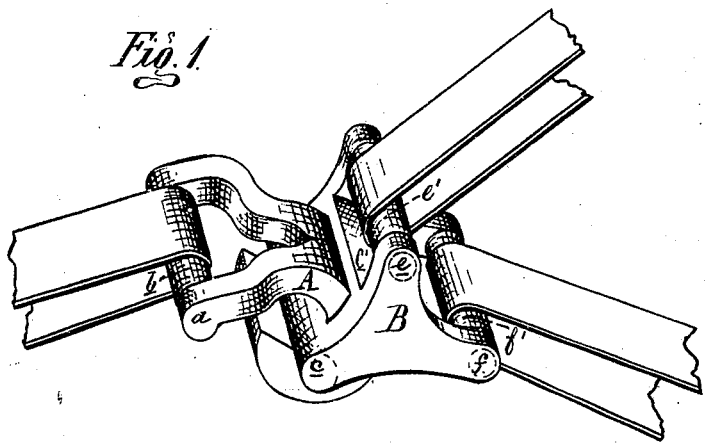
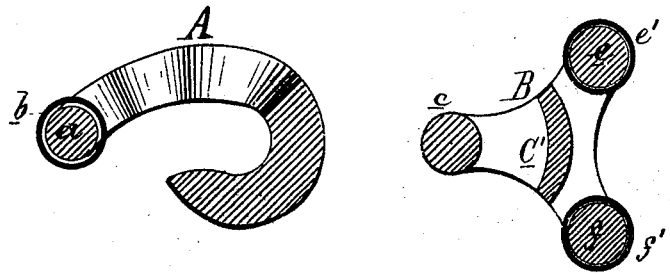

UNITED STATES PATENT OFFICE.

NELSON E. IRISH, OF FENTON, MICHIGAN.

IMPROVEMENT IN NECK-YOKE COUPLINGS.

Specification forming part of Letters Patent No. 167,768, dated September 14, 1875; application filed November 7, 1874.

*To all whom it may concern:*

Be it known that I, NELSON E. IRISH, of Fenton, in the county of Genesee and State of Michigan, have invented an Improved Neck-Yoke Coupling, of which the following is a specification:

The object of my invention is to provide a coupling for connecting the ends of the neck-yoke of a carriage-pole with the collar and harness, which can be easily connected and detached, and which will always keep the neck-yoke in its relative position.

The invention consists in a metal hook permanently attached to the ends of the yoke, and in a peculiar socket-piece for the hook to engage with, which socket-piece is secured to the collar-strap and girt-strap, as more fully hereinafter set forth, for the purpose of connecting the neck-yoke thereto.

Figure 1 is a perspective view of the coupling. Fig. 2 is a longitudinal section at $x\,x$, but showing the parts detached.

In the drawing, A represents a metallic hook having a bifurcated shank, whose ends are connected by a round girt, $a$, covered by a cylindrical roller, $b$, around which a strap is passed, which connects it with the neck-yoke. B is a socket-casting, composed of two triangular heads, connected at one angle by a round girt, $c$, and, further in, by a segment, $c'$, into the space between which and said girt $c$ the hook may engage with said girt $c$ when the shank of said hook is turned under the casting B to enter its point into the socket. At the upper angle of each head there is a round girt, $e$, covered with a friction-sleeve, $e'$. The lower angles are in like manner connected by a round girt, $f$, covered with a friction-sleeve, $f'$. The girt $e$ is connected by a strap to the bottom of the collar, and need not be detached therefrom. The girt $f$ has the strap leading under the breast from the girt buckled around it, which is the only strap that requires to be buckled or unbuckled when harnessing up or unharnessing.

The tension of the collar and girt straps being equalized upon the coupling, the neck-yoke will be kept in its relative position, as it cannot vibrate upon the pole; neither can the latter fly up in going down a grade.

The neck-yoke can readily be uncoupled in cold weather, when straps would be stiff and fingers numb.

What I claim as my invention, and desire to secure by Letters Patent, is—

The hook A, having the bifurcated ends of its shank connected by a girt, $a$, in combination with the casting B, provided with girts $c$, $c'$, $e$, and $f$, for the purpose set forth.

NELSON E. IRISH.

Witnesses:
H. F. EBERTS,
H. S. SPRAGUE.